June 19, 1956     A. J. M. LAURENT     2,750,768
DRINKING GLASS
Filed June 3, 1953
FIG_1_
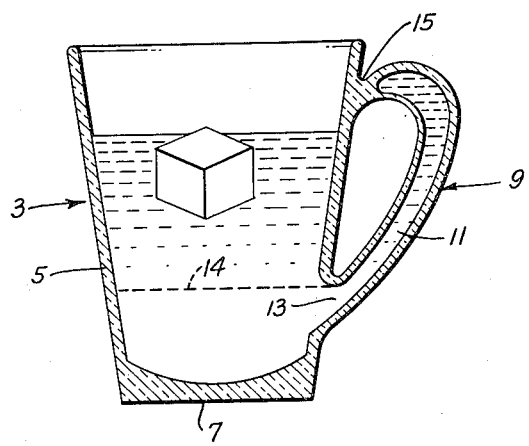
FIG_2_
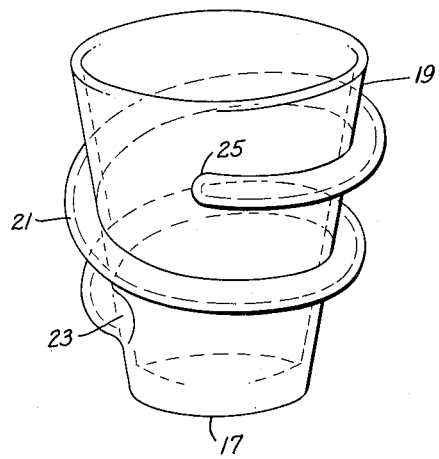
INVENTOR.
Andre J. M. Laurent
ECKHOFF & SLICK, Attys.
BY
A member of the firm

United States Patent Office 2,750,768
Patented June 19, 1956

2,750,768

DRINKING GLASS

Andre J. M. Laurent, Carmel, Calif.

Application June 3, 1953, Serial No. 359,371

1 Claim. (Cl. 65—13)

This invention relates to a drinking glass or similar article and more particularly relates to a glass having a chamber attached thereto.

In drinking a drink which has ice cubes therein, the ice melts as one drinks the drink, so that at near the end of the drink, the drink becomes very diluted. The problem is particularly serious in the case of alcoholic drinks such as highballs, since the alcoholic content of the drink is rapidly reduced by the melting of the ice, and as one drinks, the drink becomes progressively less attractive.

It is an object of the present invention to provide a glass with an auxiliary chamber whereby the diluting effect of melting ice can be largely or wholly offset.

In the drawings forming a part of this specification:

Figure 1 is a view in cross-section of a glass embodying the present invention wherein the auxiliary chamber is in the form of a handle.

Figure 2 is a perspective view of a glass wherein the auxiliary chamber forms a spiral around the outside of the glass.

Referring now to the drawings by reference characters, there is shown in Figure 1 a glass generally designated 3 of more or less conventional proportions having side walls 5 and a bottom 7. Preferably, the side walls 5 tilt outwardly slightly, as is shown. Attached to one side of the glass at a point near the bottom 7 is a handle which has been generally designated 9. Although the handle 9 can be located at the very bottom of the glass, it is preferred that the bottom of the handle 9 be elevated slightly above the bottom of the glass, as is shown in the drawing. The handle 9 consists of a hollow portion 11 which is in fluid communication with the glass proper, at the point 13. The upper portion of the handle 9 may be fastened at a point near the top of the glass 15, for added strength. However, it will be noted from the drawing that there is no fluid communication between the top of the handle 9 and the glass and that the handle 9 forms essentially an inverted air-tight chamber with its only outlet at the point 13 near the bottom of the glass.

In the embodiment shown in Figure 2, the glass again has a bottom 17 and side walls 19 of conventional proportions and a fluid chamber 21 is placed on the outside of the glass with its lower end in fluid communication with a point near the bottom of the glass 23. The chamber 21 may or may not be attached to the glass, but is preferably attached, as is shown in the drawing, for added strength. The upper portion of the chamber 21 is sealed at the point 25.

In use, the glass is tilted to one side and the reservoir filled, accompanied by rotating the glass, if necessary, with the desired liquid and then an additional amount of liquid is added to the glass proper as the glass is tilted upright. It is apparent that as soon as the liquid level in the glass reaches the dash line 14, liquid will be trapped in the reservoir and held by air pressure. The balance of the glass can then be filled with any desired liquid and/or ice. Then, as one drinks from the glass, the chamber is inoperative until the liquid level falls to a point below the line 14. At this point, air will enter the chamber, permitting the liquid to flow into the body of the glass. Thus, if the handle is filled with whiskey and one is drinking a highball from the glass, the concentration of whiskey will stay more or less constant as the drink is consumed, regardless of the melting of the ice. The chamber has been described as being located outside of the glass proper. However, it can be made part of the wall of the vessel.

Although I have described my invention as a glass, it is obvious to those skilled in the art that it may be made of materials other than glass, such as plastic or metal. Likewise, it will be apparent to those skilled in the art that the chamber may be made in various shapes and forms, so long as the principles herein set forth are adhered to.

I claim:

A drinking glass or the like comprising a glass which tapers from a relatively small bottom to a relatively large top, a handle on said glass, said handle being connected to the glass near the bottom and near the top of the glass, said handle extending away from the glass in the middle portions of both the glass and the handle, said handle having a hollow center for substantially its entire length and said hollow center having a single opening, said opening being into the body of the glass at a point near the bottom of the glass.

References Cited in the file of this patent

UNITED STATES PATENTS

| | | |
|---|---|---|
| 217,490 | Schilling | July 15, 1879 |
| 229,680 | Doyle | July 6, 1880 |
| 235,960 | Praetorius | Dec. 28, 1880 |
| 268,186 | Cave | Nov. 28, 1882 |
| 391,967 | Hennig | Oct. 30, 1886 |
| 568,529 | Frye | Sept. 29, 1896 |
| 794,996 | Mimmack | July 18, 1905 |
| 846,931 | Miller | Mar. 12, 1907 |
| 960,492 | Brinser | June 7, 1910 |
| 962,641 | Kaufmann | June 28, 1910 |
| 1,031,950 | Miller | July 9, 1912 |
| 1,101,363 | Walkup et al. | June 23, 1914 |
| 1,364,692 | Bomboy | Jan. 4, 1921 |
| 1,835,152 | George | Dec. 8, 1931 |
| 2,030,975 | Fairchild | Feb. 18, 1936 |
| 2,355,010 | Pera | Aug. 1, 1944 |
| 2,687,628 | Cunningham | Aug. 31, 1954 |

FOREIGN PATENTS

| | | |
|---|---|---|
| 47,409 | Germany | June 12, 1889 |
| 22,926 | Great Britain | Oct. 21, 1902 |
| 258,588 | Germany | Apr. 11, 1913 |
| 461,759 | France | Nov. 6, 1913 |